(12) United States Patent
Woodruff (10) Patent No.: US 8,964,772 B2
(45) Date of Patent: Feb. 24, 2015

(54) METHOD FOR IMPLEMENTING A MULTI-CHIP MODULE WITH A HIGH-RATE INTERFACE

(71) Applicant: Broadcom Corporation, Irvine, CA (US)

(72) Inventor: William Calvin Woodruff, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 198 days.

(21) Appl. No.: 13/648,227

(22) Filed: Oct. 9, 2012

(65) Prior Publication Data

US 2014/0098825 A1 Apr. 10, 2014

(51) Int. Cl.
*H04L 12/28* (2006.01)
(52) U.S. Cl.
USPC .......................................... 370/419
(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.2, 431–457, 458–463, 464–497, 370/498–529
See application file for complete search history.

(56) References Cited

U.S. PATENT DOCUMENTS

| | | | |
|---|---|---|---|
| 2003/0095564 A1* | 5/2003 | Feuerstraeter et al. | 370/445 |
| 2004/0015616 A1* | 1/2004 | Chen | 710/1 |
| 2012/0068735 A1* | 3/2012 | Harriman et al. | 326/63 |
| 2014/0098825 A1* | 4/2014 | Woodruff | 370/419 |

* cited by examiner

*Primary Examiner* — Jung-Je Liu
(74) *Attorney, Agent, or Firm* — McDermott Will & Emery LLP (57) ABSTRACT

A multi-chip module (MCM) may include a substrate, and first and second physical-layer (PHY) chips mounted on the substrate. In some implementations, the first PHY chip includes a multiplexer and a PHY circuit. The multiplexer is configured to receive a multiplexed data stream from a media access control (MAC) device, to demultiplex the multiplexed data stream into first and second data streams, to output the first data stream to the PHY circuit, and to output the second data stream to the second PHY chip. In some implementations, the first PHY includes a router and a PHY circuit. The router is configured to receive a plurality of data packets from a MAC device, to route one or more of the data packets having a first address to the PHY circuit, and to route one or more of the data packets having a second address to the second PHY chip.

20 Claims, 8 Drawing Sheets

METHOD FOR IMPLEMENTING A MULTI-CHIP MODULE WITH A HIGH-RATE INTERFACE

TECHNICAL FIELD

The present description relates generally to multi-chip modules, and more particularly, to multi-chip modules with a high-rate interface.

BACKGROUND

Ethernet is widely used to transport voice, data and multimedia traffic between computing devices because of its high speed, relatively low cost, and ease of installation. A computing device (e.g., a voice over Internet (VoIP) device, a network camera, a computer, etc.) may be connected to an Ethernet switch or an access point by an Ethernet cable, and may communicate with another computing device via the Ethernet switch or access point.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

Figure 1:
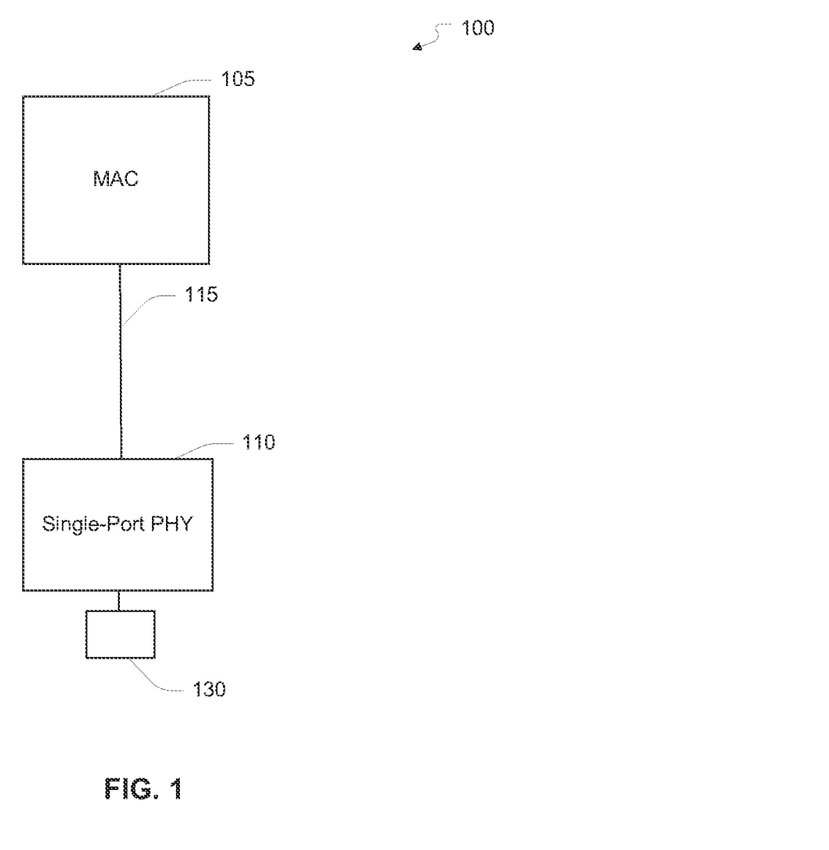
FIG. 1 illustrates an example of an Ethernet system that includes a single-port physical layer (PHY) chip.

FIG. 1 shows an example of an Ethernet system 100 that may be used in an access point to provide a computing device with access to an Ethernet network. The Ethernet system 100 includes a media access control (MAC) device 105, a single-port physical layer device (PHY) 110, and a connector 130 (e.g., RJ-45 connector) that connects the Ethernet system 100 to an Ethernet cable (not shown). The Ethernet cable may include wires (e.g., copper wires) or optical fibers. In some implementations, the Ethernet cable includes four twisted wire pairs.

The MAC device 105 implements data-link layer (OSI layer 2) processing of data, including encapsulation of data into frames and media access management. The MAC device 105 outputs a data stream to the PHY 110 via a MAC/PHY interface 115 (e.g., a serial gigabit media independent interface (SGMII)). The PHY 110 may perform physical-layer (OSI layer 1) processing on the data stream from the MAC device 105 to convert the data stream into a physical-layer data signal for transmission on the Ethernet cable. The physical layer may include a physical coding sublayer and a physical medium dependent sublayer. The physical-layer data signal from the PHY 110 is output to the Ethernet cable via the connector 130.

Figure 2:
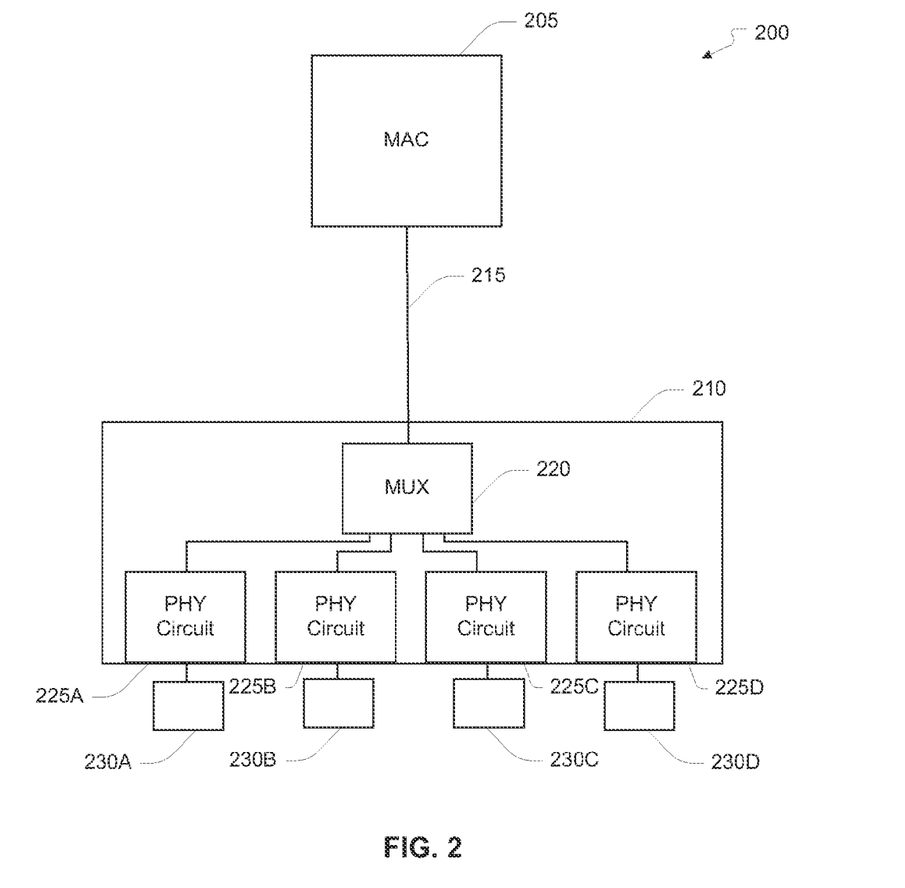
FIG. 2 illustrates an example of an Ethernet system that includes a multi-port physical layer (PHY) chip.

FIG. 2 shows an example of an Ethernet system 200 that may be used in a multi-port Ethernet switch to connect multiple devices to an Ethernet network. The Ethernet system 200 includes a MAC device 205, a quad-port PHY 210, and four connectors 230A-230D (e.g., four RJ-45 connectors) that connect the Ethernet system 200 to four separate Ethernet cables (not shown).

The MAC device 205 implements data-link layer (OSI layer 2) processing of data, including encapsulation of data into frames and media access management. The MAC device 205 may receive data to be transmitted on the four Ethernet cables to different computing devices, and process the data at the data-link layer into four data streams, where each data stream is to be transmitted on a different one of the Ethernet cables. The MAC device 205 may multiplex the data streams into a multiplexed data stream (e.g., a serial multiplexed data stream), and output the multiplexed data stream to the quad-port PHY 210 via a MAC/PHY interface 215 (e.g., a quad SGMII (QSGMII)). For QSGMII implementations, each data stream may have a data rate of approximately 1 Gbit/s and the multiplexed data stream may have a data rate of approximately 4 Gbit/s.

The quad-port PHY 210 includes a multiplexer (MUX) 220, and four physical layer (PHY) circuits 225A-225D. The MUX 220 demultiplexes the multiplexed data stream from the MAC device 205 into the four data streams. For QSGMII implementations, the MUX 220 may demultiplex a QSGMII data stream into four SGMII data streams. The MUX 220 outputs each data stream to a different one of the PHY circuits 225A-225D. Each PHY circuit 225A-225D performs physical-layer (OSI layer 1) processing on the respective data stream to convert the data stream into a physical-layer data signal for transmission on the respective Ethernet cable. Each PHY circuit 225A-225D outputs the respective physical-layer data signal to the respective Ethernet cable via the respective connector 230A-230D (e.g., RJ-45 connector).

The quad-port PHY 210 may be integrated on a single chip. An advantage of integrating the quad-port PHY 210 is that it reduces the number of off-chip I/Os in an Ethernet switch. This is because the quad-port PHY 210 uses a single high-speed MAC/PHY interface to communicate with the MAC device 205.

To address both the single-port market (e.g., access point market) and the multi-port market (e.g., Ethernet switch market), a PHY chip manufacturer may separately develop a single-port PHY chip and a multi-port PHY chip (e.g., a quad-port PHY chip). However, having separate chip developments to address both markets drives up development costs. Accordingly, it is desirable to develop a PHY chip that can address both markets.

Figure 3:
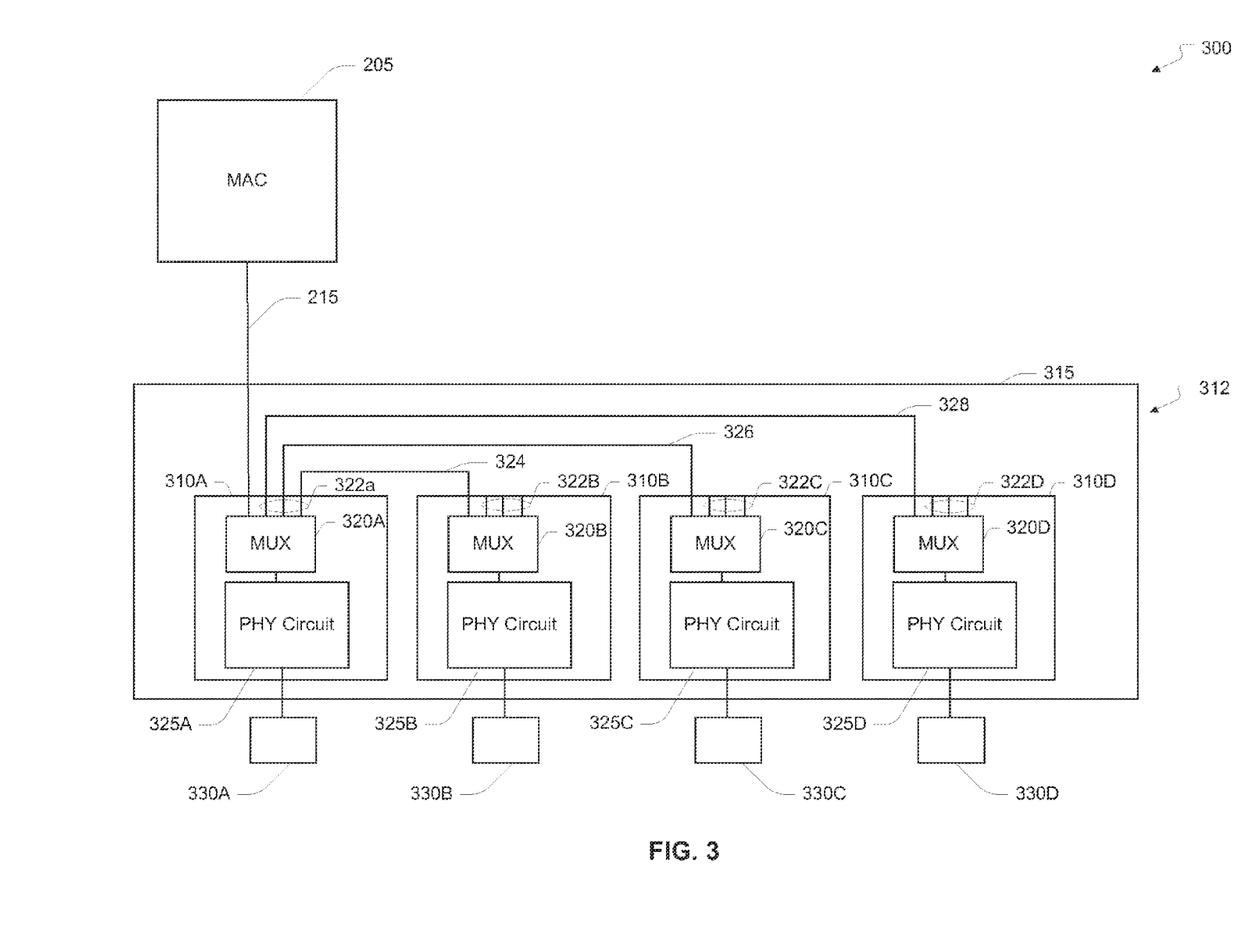
FIG. 3 illustrates an example multi-chip module with a high-rate interface according to some aspects of the subject technology.

FIG. 3 illustrates an example multi-port system 300 including a multi-chip module (MCM) 312 according to aspects of the subject technology. The MCM 312 includes a first single-port PHY 310A, a second single-port PHY 310B, a third single-port PHY 310C, and a fourth single-port PHY 310D. Each single-port PHY 310A-310D may be integrated on a separate chip or die, and may be identical. The single-port PHYs 310A-310D may be mounted on a common substrate 315, such as a ceramic substrate, and/or another type of substrate to form the MCM 312.

Each single-port PHY 310A-310D includes a MUX 320A-320D and a PHY circuit 325A-325D for performing physical-link layer processing. Each single-port PHY 310A-310D is connected to a respective Ethernet cable (not shown) via a respective connector 330A-330D (e.g., RJ-45 connector). The first single-port PHY 320A is connected to the MAC device 205 via a high-speed MAC/PHY interface 215. In addition, the first single-port PHY 320A is connected to the second, third and fourth single-port PHYs 310B, 310C and 310D via lower-speed interfaces 324, 326 and 328, respectively, as shown in FIG. 3. The interfaces 324, 326 and 328 interconnect the PHYs 310A-310D of the MCM 312. Any of the lower-speed interfaces 324, 326 and 328 may include a conductive trace on the substrate 315.

In operation, the MAC device 205 receives data to be transmitted on the four Ethernet cables, processes the data at the data-link layer into four data streams, and multiplexes the data streams into a multiplexed data stream (e.g., a serial multiplexed data stream). The multiplexed data stream is output to the first single-port PHY 310A via the MAC/PHY interface 215. The MAC device 205 may multiplex the data streams by interleaving the bits or bytes of the data streams. The MAC device 205 may use another multiplexing technique, including, but not limited to, frequency division multiplexing, code division multiplexing, etc.

The MUX 320A of the first single-port PHY 310A demultiplexes the multiplexed data stream into the four data streams. Each demultiplexed data stream may have a data rate equal to one-fourth the data rate of the multiplexed data stream. The MUX 320A outputs one of the data streams to the respective PHY circuit 325A on the same chip. The PHY circuit 325A performs physical-layer (OSI layer 1) processing on the data stream to convert the data stream into a physical-layer data signal for transmission on the respective Ethernet cable via connector 330A.

The MUX 320A of the first single-port PHY 310A outputs each of the other three data streams to a different one of the second, third and fourth single-port PHYs 310B-310D via the respective interface 324, 326 and 328. The MUX 320B-320D in each of the second, third and fourth single-port PHYs 310B-310D passes the received data stream to the respective PHY circuit 325B-325D. Each PHY circuit 325B-325D performs physical-layer (OSI layer 1) processing on the respective data stream to convert the data stream into a physical-layer data signal for transmission on the respective Ethernet cable via the respective connector 330B-330D.

The single-port PHY that receives the multiplexed data stream from the MAC device 205, demultiplexes the multiplexed data stream, and outputs the demultiplexed data streams to other PHYs in the MCM 312 may be referred to as a master PHY. Each of the other single-port PHYs that receives a data stream from the master PHY may be referred to as a slave PHY. In the example in FIG. 3, the first single-port PHY 310A acts as a master PHY and the second, third and fourth single-port PHYs 310B-310D act as slave PHYs.

The MUX 320A-320D in each of the single-ports PHY 310A-310D may have the capability of demultiplexing a multiplexed data stream from the MAC device 205 into demultiplexed data streams. When a single-port PHY acts as a slave, this capability of the respective MUX may be unused, in which case the respective MUX may simply pass a received data stream to the respective PHY circuit.

Any of the MUXs 320A-320D may be implemented using a programmable MUX that can be selectively programmed to operate in one of a first mode and a second mode. In the first mode, the MUX demultiplexs a multiplexed data stream from the MAC device 205 into multiple data streams, and, in the second mode, the MUX passes a received data stream to the respective PHY circuit. The MUX may be programmed in operate in the first mode or the second mode depending on whether the respective single-port PHY is to be used as a master or a slave.

Thus, each of the single-port PHYs 310A-310D may be capable of acting as a master PHY or a slave PHY. When a single-port PHY acts as a slave PHY, three of the I/Os of the respective MUX are not used since they are not needed to output demultiplexed data streams to the other PHYs. As shown in the example in FIG. 3, three of the I/Os 322B of the second single-port PHY 310B are unused, three of the I/Os 322C of the third single-port PHY 310C are unused, and three of the I/Os 322D of the fourth single-port PHY 310D are unused. All three of the corresponding I/Os 322A of the first single-port PHY 310A are used to output demultiplexed data streams to the other singe-port PHYs.

Thus, the subject technology allows a multi-port MCM 312 with one interface to the MAC device 205 to be created using multiple single-port PHYs 310A-310D, each of which can be on a separate chip. In addition, any of the single-port PHYs 310A-310D may be used in a single-port system (e.g., access point).

Figure 4:
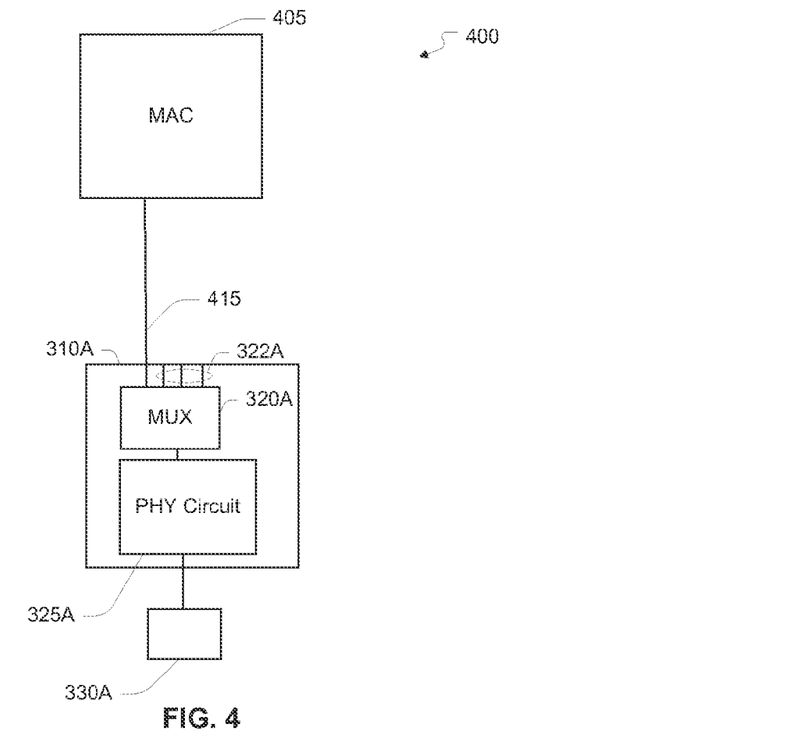
FIG. 4 illustrates an example single-port Ethernet system according to some aspects of the subject technology.

FIG. 4 shows an example in which the first single-port PHY 310A is used in a single-port Ethernet system 400 (e.g., an access point). In this example, the MUX 320A of the first single-port PHY 310A may receive a data stream from a MAC device 405 via a MAC/PHY interface 415, and pass the received data stream to the respective PHY circuit 325A for physical-layer processing. In this case, the demultiplexing function of the MUX 320A is not used, and three of the I/Os 322A of the MUX 320A are not used.

Therefore, the subject technology allows one type of chip to be used in multi-port and single-port applications. In other words, the subject technology allows one chip development to address both the multi-port market (e.g., Ethernet switch) and single-port market (e.g., access point) markets, thereby reducing development costs.

Although the MCM 312 is described above using the example of four single-port PHYs, it is to be appreciated that the subject technology is not limit to this example, and that the MCM 312 may include any number of single-port PHYs. Generally speaking, the MCM 312 may include N single-port PHYs, in which N is an integer and the MAC device 205 multiplexes N data streams into a multiplexed data stream. The MUX in a first one of the single-port PHYs may demultiplex the multiplexed data stream into the N data streams, output one of the N data streams to the respective PHY circuit for physical-layer processing, and output each of the other data streams to a different one of the other single-port PHYs.

Figure 5:
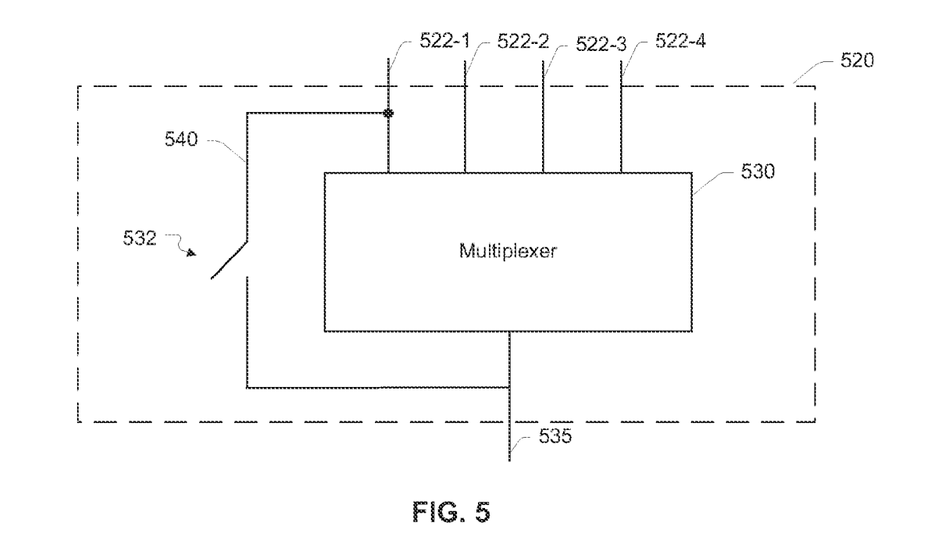
FIG. 5 illustrates an example programmable multiplexer according to some aspects of the subject technology.

FIG. 5 illustrates a programmable MUX 520 according to some aspects of the subject technology. The programmable MUX 520 may be used to implement any one of the MUXs 320A-320D. The programmable MUX 520 may be coupled to four I/Os 522-1 to 522-4 of the respective single-port PHY. I/Os 522-1 and 522-4 may couple the MUX 520 to separate external pins or contacts (not shown) of the respective single-port PHY for connection to other single-port PHYs and/or a MAC device.

The programmable MUX 520 includes a multiplexer 530, a connection 535 to the respective PHY circuit, and a switch 532 connected between I/O 522-1 and the PHY circuit. The multiplexer 530 may be configured to receive a multiplexed data stream on I/O 522-1, demultiplex the multiplexed data stream into four data streams, output one of the demultiplexed data streams to the respective PHY circuit via connection 535, and output each of the other demultiplexed data streams to a different one of I/Os 522-2 to 522-4.

The programmable MUX 520 may be selectively programmed to operate in one of a first mode and a second mode. In the first mode, the MUX 520 demultiplexes a multiplexed data stream. The MUX 520 may be programmed to operate in the first mode by opening switch 532 and powering on the multiplexer 530. When the MUX 520 is to operate in the first mode, I/O 522-1 may be connected to the MAC device 205 via a MAC/PHY interface 215, and each of I/Os 522-2 to 522-4 may be connected to a different one of the other single-port PHYs on the MCM 312.

In the first mode, the multiplexer 530 receives a multiplexed data stream from the MAC device 205 via I/O 522-1, demultiplexes the multiplexed data stream, outputs one of the demultiplexed data streams to the respective PHY circuit via connection 535, and outputs each of the other demultiplexed data streams to a different one of the other single-port PHYs via the respective I/O 522-2 to 522-4.

In the second mode, the MUX 520 passes a received data stream to the respective PHY circuit. The MUX 520 may be programmed to operate in the second mode by closing switch 532 and powering off the multiplexer 530. Closing the switch 532 creates a path 540 between I/O 522-1 and the respective PHY circuit, bypassing the multiplexer 530. When the MUX 520 is to operate in the second mode, I/O 522-1 may be connected to a master single-port PHY or a MAC device. In the second mode, the MUX 520 receives a data stream on I/O 522-1 from a master PHY or a MAC device, and passes the received data stream to the respective PHY circuit via path 540 and connection 535.

Figure 6:
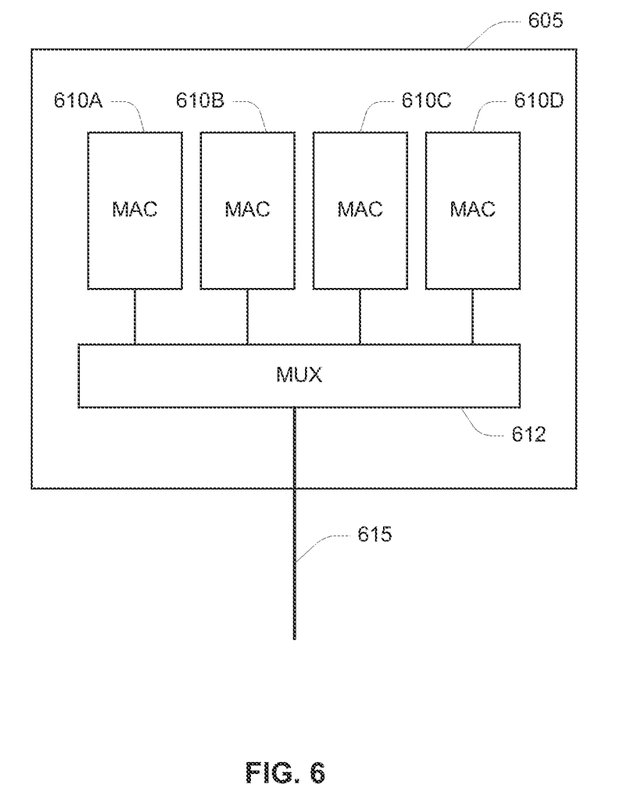
FIG. 6 illustrates an example media access control (MAC) device according to some aspects of the subject technology.

FIG. 6 illustrates a MAC device 605 that may be used with the MCM 312 according to aspects of the subject technology. The MAC device 605 includes four MAC circuits 610A-610D and a multiplexer (MUX) 612. Each MAC circuit 610A-610D performs data-link layer (OSI layer 2) processing on data to be transmitted on a different one of the Ethernet cables, and outputs a data stream to the MUX 612. The MUX 612 multiplexes the data streams from the MAC circuits 610A-610D into a multiplexed data stream, and outputs the multiplexed data stream to the MCM 312 via a MAC/PHY interface 615.

At the MCM 312 (shown in FIG. 3), the MUX 320A of the first single-port PHY 310A demultiplexes the multiplex data stream into the four data streams corresponding to MAC circuits 610A-610D. The MUX 320A of the first single-port PHY 310A outputs the data stream corresponding to MAC circuit 610A to the respective PHY circuit 325A for physical-layer processing, and outputs the data streams corresponding to MAC circuits 610B, 610C and 610D to the second, third and fourth single-port PHYs 610B, 610C and 610D, respectively. Each single-port PHY performs physical-layer (OSI layer 1) processing on the respective data stream.

In some implementations, the MUX 612 may multiplex the data streams from MAC circuits 610A-610D using bit-interleaved multiplexing or byte-interleaved multiplexing. In bit-interleaved multiplexing, the MUX 612 interleaves the bits of the data streams, in which the bits of a particular data stream appear in every fourth bit of the multiplexed data stream. The MUX 612 may do this by sequentially outputting a first bit from each data stream, then sequentially outputting a second bit from each data stream, and so forth. The MUX 320A of the first single-port PHY 310A may demultiplex the multiplexed data stream by de-interleaving the bits of the multiplexed data stream into the four data streams. For example, the MUX 320A may output a demultiplexed data stream at one of the outputs of the MUX 320A by outputting every fourth bit in the multiplexed data stream to that output.

In byte-interleaved multiplexing, the MUX 612 interleaves the bytes of the data streams, in which the bytes of a particular data stream appear in every fourth byte of the multiplexed data stream. Each byte may be made up of 8 bits, 10 bits or another number of bits. The MUX 612 may do this by sequentially outputting a first byte from each data stream, then sequentially outputting a second byte from each data stream, and so forth. The MUX 320A of the first single-port PHY 310A may demultiplex the multiplexed data stream by de-interleaving the bytes of the multiplexed data stream into the four data streams. For example, the MUX 320A may output a demultiplexed data stream at one of the outputs of the MUX 320A by outputting every fourth byte in the multiplexed data stream to that output.

Although the MAC device 605 is described above using the example of four MAC circuits 610A-610D, it is to be appreciated that the subject technology is not limit to this example, and that the MAC device 605 may include any number of MAC circuits. Generally speaking, the MAC device 605 may include N MAC circuits that output N data streams, in which N is an integer and the MUX 612 multiplexes the N data streams into a multiplexed data stream.

In some implementations, each PHY circuit 325A-325D may output data to the respective Ethernet cable at a data rate of approximately 2.5 Gbit/s. Each PHY circuit 325A-325D may achieve a data rate of approximately 2.5 Gbit/s by modulating data using double square (DSQ) 128 modulation or other high-level modulation scheme. Any of the Ethernet cables may be a CAT 5e cable, a CAT 6 cable, or another type of cable.

In these implementations, the MAC device 205 may output the multiplexed data stream at a data rate of approximately 10 Gbit/s, and the MUX 320A of the first single-port PHY 310A may demultiplex the multiplexed data stream into four data streams, where each data stream has a data rate of approximately 2.5 Gbit/s. The MUX 320 may output one of the data streams to the respective PHY circuit 325A, and output each of the other three data streams to a different one of the second, third and fourth single-port PHYs 310B-310D via the respective interface 324, 326 and 328.

Although aspects of the subject technology aspects are described using the example in which the single-port PHYs 310A-310D transmit data on the respective Ethernet cables, it is to be appreciated that the single-port PHYs 310A-310D may also receive data from the respective Ethernet cables. Thus, the single-port PHYs 310A-310D may be bi-directional. In some implementations, when a PHY circuit receives a physical-layer data signal from the respective Ethernet cable, the PHY circuit may perform physical layer (OSI layer 1) processing on the received physical-layer data signal to convert the physical-layer data signal into a data stream. The MUX 320B-320D in each of the second, third and fourth single-port PHYs 310B-310D may output the respective data stream to the MUX 320A of the first single-port PHY 310A via the respective interface 324, 326 and 328. The MUX 320A in the first single-port PHY 310A may multiplex the data stream from the respective PHY circuit 325A with the data streams from the other single-port PHYs 310B-310D into a multiplexed data stream, and output the multiplexed data stream to the MAC device 205 via the MAC/PHY interface 215.

Figure 7:
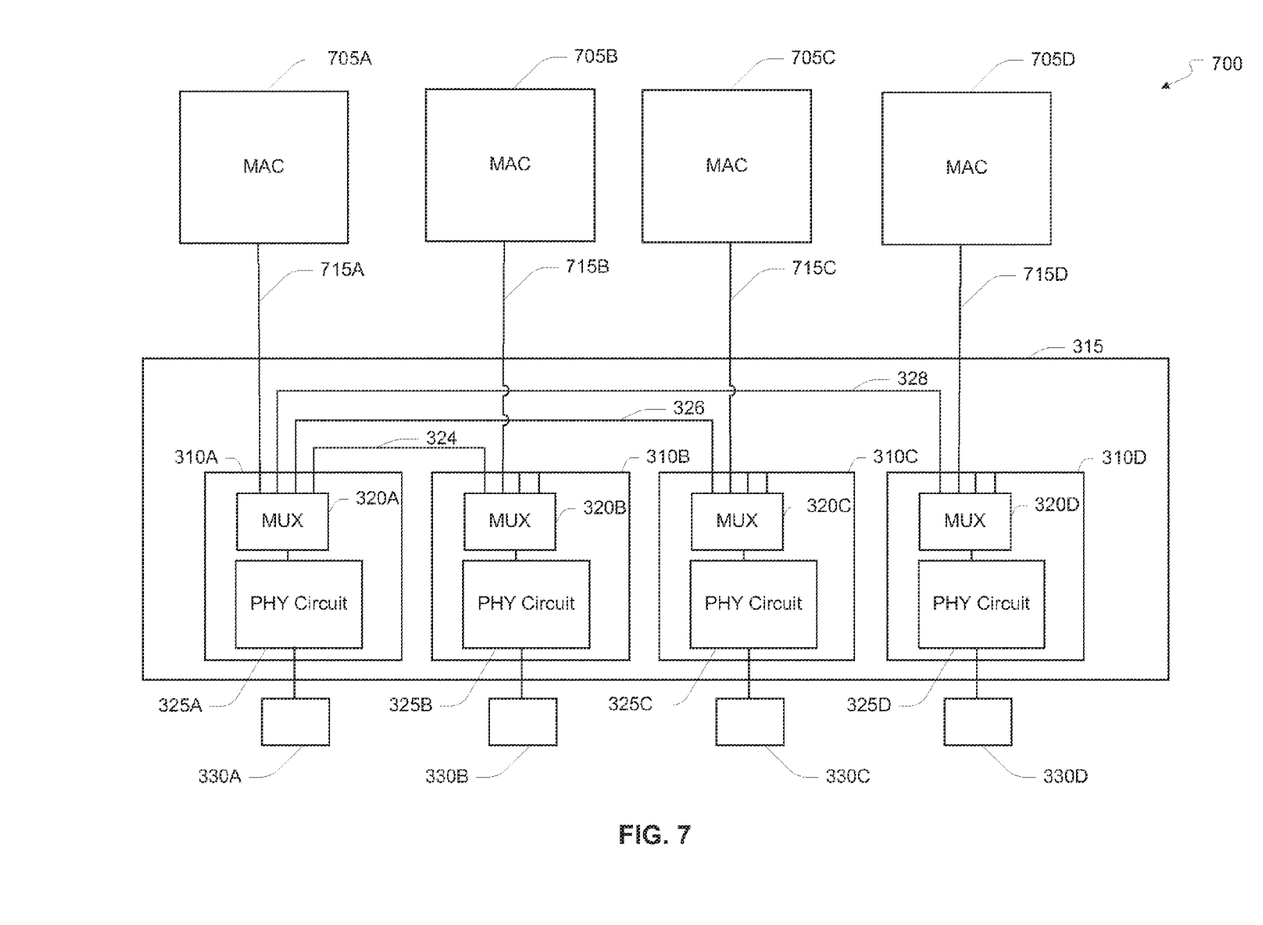
FIG. 7 illustrates an example multi-chip module with multiple interfaces according to some aspects of the subject technology.

The MCM 312 may also be connected to multiple MAC devices via multiple MAC/PHY interfaces. In this regard, FIG. 7 shows an example multi-port system 700 including four MAC devices 705A-705D connected to the single-port PHYs 310A-310D of the MCM 312 via separate MAC/PHY interfaces 715A-715D, respectively. Each MUX 320A-320D receives a data stream from the respective MAC device 705A-705D via the respective MAC/PHY interface 715A-715D, and passes the received data stream to the respective PHY circuit 325A-325D for physical-layer processing. In this case, the interfaces 324, 326 and 328 connecting the first single-port PHY 310A to the second, third and fourth single-port PHYs 310B-310D, respectively, are not used.

Each MUX 320A-320D may be implemented using a programmable MUX that can be programmed to pass a data stream received on any I/O of the MUX to the respective PHY circuit for physical-layer processing. For example, when the MCM 312 is used in the multi-port system 700 in FIG. 7, the MUX 320A-320D is each single-port PHY 310A-310D may be programmed to pass a data stream received on the I/O connected to the respective MAC/PHY interface 715A-715D to the respective PHY circuit 325A-325D. In this case, each single-port PHYs 310A-310D may operate independently, and the electrical interconnections (i.e., interfaces 324, 326 and 328) between the single-port PHYs 310A-310D are not used.

When the MCM 312 is used in the multi-port system 300 in FIG. 3, the MUX 320A in the first single-port PHY 310A may be programmed to demultiplex a multiplex data stream received on the I/O connected to the MAC/PHY interface 215, output one of the demultiplexed data streams to the respective PHY circuit 325A, and output each of the other demultiplexed data streams to a different one of the three I/Os connected to the interfaces 324, 326 and 328. The MUX 320B-320D in each of the second, third and fourth single-port PHYs 310B-310D may be programmed to pass a data stream received on the I/O connected to the respective interface 324, 326 and 328 to the respective PHY circuit 325B-325D.

Thus, the MCM 312 may be connected to a MAC device 205 via a single high-rate MAC/PHY interface or connected to multiple MAC devices 705A-705D via separate lower-rate MAC/PHY interfaces 715A-715D. This provides the MCM 312 with the flexibility of being used in different system configurations.

Figure 8:
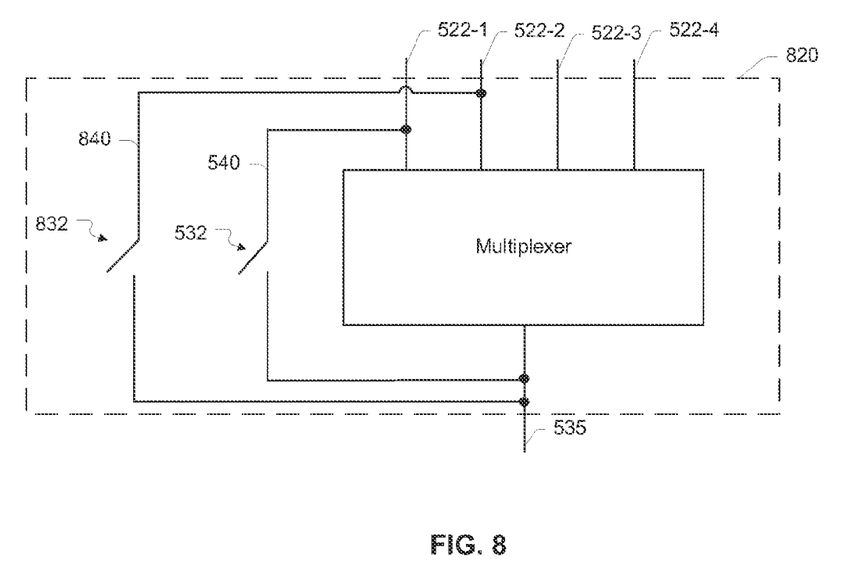
FIG. 8 illustrates an example programmable multiplexer according to some aspects of the subject technology.

FIG. 8 illustrates a programmable MUX 820 according to some aspects of the subject technology. The programmable MUX 820 is similar to the programmable MUX 520 in FIG. 5, and further includes a second switch 832 connected between I/O 522-2 and connection 535 to the respective PHY circuit.

When the programmable MUX 820 is used to demultiplex a multiplexed data stream from the MAC device 205 or pass a data stream received on I/O 522-1 to the respective PHY circuit, the second switch 832 may be open. When the programmable MUX 820 is used to pass a data stream received from the respective MAC device 705A-705D in the system 700 in FIG. 7, I/O 522-2 may be connected to the respective MAC device 705A-705D via the respective MAC/PHY interface 715A-715D, the second switch 832 may be closed, the first switch 532 may be open, and the multiplexer 530 may be powered off. In this case, closing the second switch 832 creates a path 840 between I/O 522-2 and the respective PHY circuit that bypasses the multiplexer 530. As a result, a data stream received from the respective MAC device on I/O 522-2 is passed to the respective PHY circuit.

Figure 9:
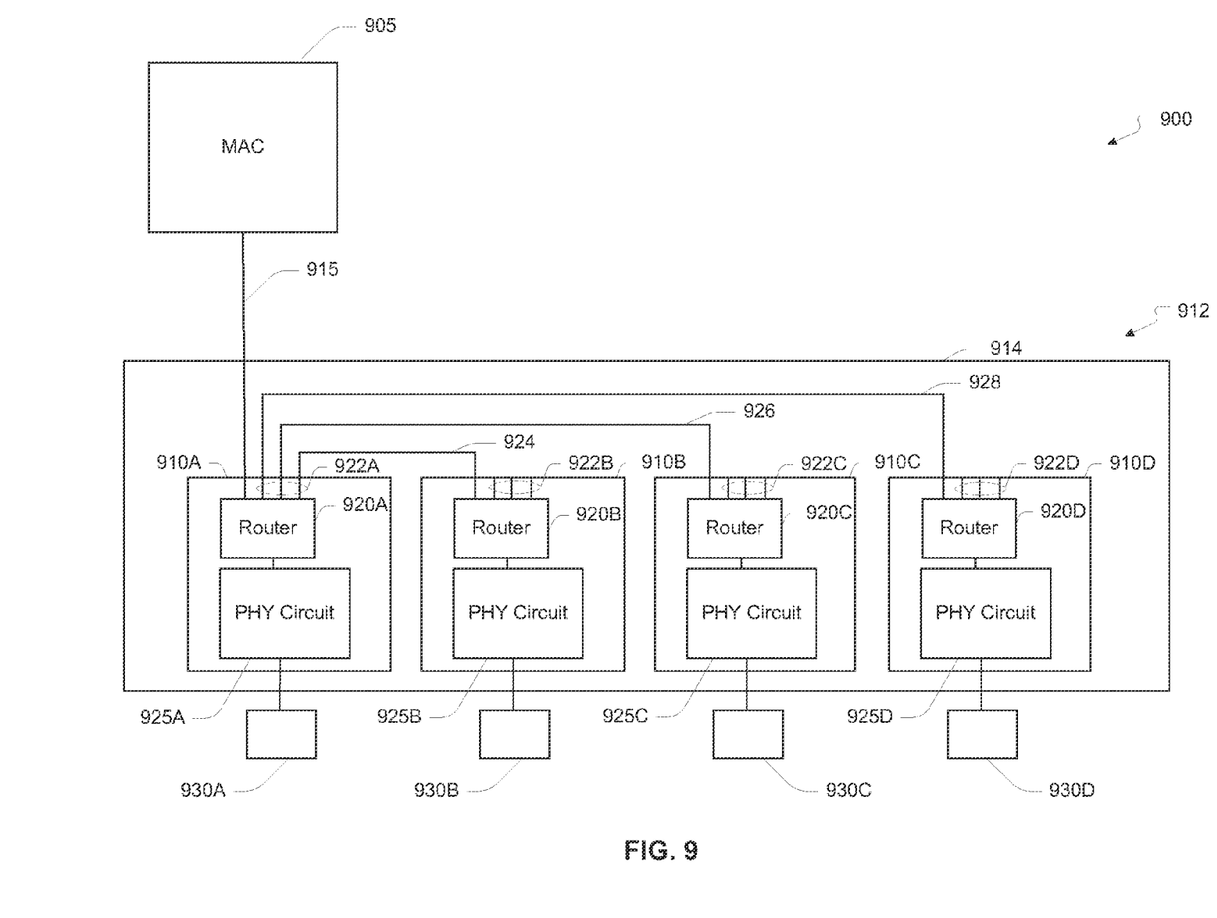
FIG. 9 illustrates a multi-chip module according to some aspects of the subject technology.

FIG. 9 illustrates an example multi-port system 900 including a multi-chip module (MCM) 912 according to aspects of the subject technology. The MCM 912 includes a first single-port PHY 910A, a second single-port PHY 910B, a third single-port PHY 910C, and a fourth single-port PHY 910D. Each single-port PHY 910A-910D may be integrated on a separate chip or die, and may be identical. The single-port PHYs 910A-910D may be mounted on a common substrate 914 to form the MCM 912.

Each single-port PHY 910A-910D includes a packet router 920A-920D and a PHY circuit 925A-925D for performing physical-link layer processing. Each single-port PHY 910A-910D is connected to a respective Ethernet cable (not shown) via a respective connector 930A-930D (e.g., RJ-45 connector). The first single-port PHY 920A is connected to the MAC device 905 via a high-speed MAC/PHY interface 915. In addition, the first single-port PHY 320A is connected to the second, third and fourth single-port PHYs 910B, 910C and 910D via lower-speed interfaces 924, 926 and 928, respectively, as shown in FIG. 9.

In operation, the MAC device 905 receives data to be transmitted on the four Ethernet cables to four different computing devices (e.g., VoIP devices, access points, etc.). The MAC device 905 processes the data for each computing device into data packets, where each packet may include an address identifying the computing device as a destination of the packet. A data packet may also be referred to as a frame. The MAC device 905 outputs the data packets for the different computing devices to the MCM 912 via the interface 915. The MAC device 905 may output the data packets for the different computing devices one packet at a time. For example, the MAC device 905 may interleave the data packets for the different computing devices and output the interleaved packets to the MCM 912 via the interface 915.

In some implementations, the data packets for the different computing devices may have different sizes. In these implementations, the MAC device 905 may manage the data packet traffic such that the data rate (number of bits per unit of time) for each computing device is approximately the same. In other words, the MAC device 905 may implement a traffic policy in which each computing device (and hence respective PHY) is allocated approximately an equal share of the total data rate of the interface 915.

To do this, the MAC device 905 may include a buffer that temporarily stores data packets for the different computing devices. The MAC device 905 may then output the data packets in the buffer to the interface 915 in an order that results in approximately equal data rates for the computing devices. For example, if large data packets are addressed to a first one of the computing devices and smaller packets are addressed to a second one of the computing devices, then the MAC device 905 may output several packets addressed to the second computing device for every packet addressed to the first device such that the data rates for the devices are approximately equal. For implementations in which each single-port PHY 910A-910D operates at a data rate of approximately 2.5 Gbits/s, the MAC device 905 may manage the data packet traffic such that the data rate for each computing device is approximately 2.5 Gbits/s. In this case, the data rate of the interface 915 may be 10 Gbits/s.

The router 920A of the first single-port PHY 910A looks at the addresses of incoming data packets from the MAC device 905, and routes the data packets accordingly. If a packet is addressed to a computing device corresponding to the first single-port PHY 910A, the router 920A routes the data packet to the respective PHY circuit 925A for physical-layer processing. If a packet is addressed to a computing device corresponding to the second single-port PHY 910B, the router 920A routes the data packet to the second single-port PHY 910B via the respective interface 924. If a packet is addressed to a computing device corresponding to the third single-port PHY 910C, the router 920A routes the data packet to the third single-port PHY 910C via the respective interface 926. If a packet is addressed to a computing device corresponding to the fourth single-port PHY 910D, the router 920A routes the data packet to the fourth single-port PHY 910D via the respective interface 928.

The router 920B-920D in each of the second, third and fourth single-port PHYs 910B-910D passes received packets to the respective PHY circuit 925B-925D. Each PHY circuit 925B-925D performs physical-layer (OSI layer 1) processing on the respective data packets to convert the data packets into a physical-layer data signal for transmission to the respective computing device via the respective Ethernet cable.

The router 920A-920D in each of the single-port PHYs 910A-910D may have the capability of routing each data packet from the MAC device 905 to the respective PHY circuit or another single-port PHY based on the address of the packet. When a single-port PHY 910A-910D acts as a slave, the address routing functionality of the respective router may be turned off, in which case the respective router may simply pass a received data packet to the respective PHY circuit without looking at the address of the packet.

In some implementations, each router 920A-920D may be configured to be selectively programmed to operate in one of a first mode and a second mode. In the first mode, the router may be configured to route data packets based on addresses of the data packets. For example, the router may route packets addressed to a computing device corresponding to the corresponding single-port PHY to the respective PHY circuit, and route packets addressed to other computing devices to the corresponding single-port PHYs. In the second mode, the router may be configured to pass data packets received from a master PHY or a MAC device to the respective PHY without looking at the addresses of the packets.

Thus, each of the single-port PHYs 910A-910D may be capable of acting as a master PHY or a slave PHY. When a single-port PHY acts as a slave PHY, three of the I/Os of the respective router are not used since they are not needed to route packets to the other PHYs. As shown in the example in FIG. 9, three of the I/Os 922B of the second single-port PHY 910B are unused, three of the I/Os 922C of the third single-port PHY 910C are unused, and three of the I/Os 922D of the fourth single-port PHY 910D are unused. All three of the corresponding I/Os 922A of the first single-port PHY 910A are used to route packets to the other singe-port PHYs.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry.

Some implementations can include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Some implementations can be performed by a microprocessor or multi-core processors that execute software. Some implementations can be performed by one or more integrated circuits, such as application specific integrated circuits (ASICs) or field programmable gate arrays (FPGAs). In some implementations, such integrated circuits can execute instructions that are stored on the circuit itself.

Many of the above-described features and applications may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology.

A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A multi-chip module, comprising:
   a substrate;
   a first physical-layer (PHY) chip mounted on the substrate, the first PHY chip comprising a multiplexer and a first physical-layer (PHY) circuit;
   a second PHY chip mounted on the substrate; and
   a first physical interface coupling the first PHY chip to the second PHY chip;
   wherein the multiplexer of the first PHY chip is configured to receive a multiplexed data stream from a media access control (MAC) device, the multiplexed data stream comprising a first data stream associated with the first PHY chip and a second data stream associated with the second PHY chip, to demultiplex the multiplexed data stream into the first data stream and the second data stream at the first PHY chip, to output the first data stream to the first PHY circuit of the first PHY chip, and to transmit the second data stream from the first PHY chip to the second PHY chip via the first physical interface.

2. The multi-chip module of claim 1, wherein the multiplexer is configured to demultiplex the multiplexed data stream by de-interleaving bytes or bits in the multiplexed data stream.

3. The multi-chip module of claim 1, further comprising:
   a third PHY chip mounted on the substrate;
   a fourth PHY chip mounted on the substrate;
   a second physical interface coupling the first PHY chip to the third PHY chip; and
   a third physical interface coupling the first PHY chip to the fourth PHY chip;
   wherein the multiplexed data stream further comprises a third data stream associated with the third PHY chip and a fourth data stream associated with the fourth PHY chip, and the multiplexer of the first PHY chip is further configured to demultiplex the multiplexed data stream into the third data stream and the fourth data stream at the first PHY chip, to transmit the third data stream from the first PHY chip to the third PHY chip via the second physical interface, and to transmit the fourth data stream from the first PHY chip to the fourth PHY chip via the third physical interface.

4. The multi-chip module of claim 3, wherein the first data stream has a data rate that is approximately one-fourth a data rate of the multiplexed data stream.

5. The multi-chip module of claim 4, wherein the multiplexed data stream has a data rate of approximately 10 Gbits per second, and each of the first, second, third and fourth data streams has a data rate of approximately 2.5 Gbits per second.

6. The multi-chip module of claim 1, wherein the second PHY chip comprises a second multiplexer and a second PHY circuit, and wherein the second multiplexer is configured to receive the second data stream from the first PHY chip via the first physical interface, and to pass the second data stream to the second PHY circuit.

7. The multi-chip module of claim 6, wherein the second multiplexer is configured to selectively operate in one of a first mode and a second mode, in the first mode, the second multiplexer is configured to demultiplex a multiplexed data stream, in the second mode, the second multiplexer is configured to pass the second data stream to the second PHY circuit, and the second multiplexer is programmed to operate in the second mode.

8. The multi-chip module of claim 7, wherein the first PHY chip and the second PHY chip are substantially identical.

9. The multi-chip module of claim 6, wherein the first PHY circuit is configured to convert the first data stream into a first physical-layer data signal for transmission on a first Ethernet cable, and the second PHY circuit is configured to convert the second data stream into a second physical-layer data signal for transmission on a second Ethernet cable.

10. A physical-layer (PHY) chip, comprising:
    a multiplexer configured to selectively operate in one of a first mode and a second mode; and
    a PHY circuit; and
    a first physical interface coupling the PHY chip to another PHY chip;
    wherein, in the first mode, the multiplexer is configured to demultiplex a multiplexed data stream received by the PHY chip into a first data stream associated with the PHY chip and a second data stream associated with the another PHY chip, to output the first data stream to the PHY circuit, and to output the second data stream to the another PHY chip via the first physical interface, and, in the second mode, the multiplexer is configured to pass a data stream received by the PHY chip to the PHY circuit;
    wherein the PHY circuit is configured to convert the data stream from the multiplexer into a physical-layer data signal for transmission on an Ethernet cable.

11. The PHY chip of claim 10, wherein the multiplexer is configured to demultiplex the multiplexed data stream by de-interleaving bytes or bits in the multiplexed data stream.

12. The PHY chip of claim 10, further comprising:
    a first input/output (I/O) coupled to the multiplexer; and
    a second I/O coupled to the multiplexer, the second I/O comprising the first physical interface;
    wherein, in the first mode, the multiplexer is configured to receive the multiplexed data stream on the first I/O, and to output the second data stream to the another PHY chip on the second I/O, and, in the second mode, the multiplexer is configured to receive the data stream pass a data stream received on the first I/O to the PHY circuit.

13. The PHY chip of claim 12, wherein the multiplexer is further configured to selectively operate in a third mode, and wherein, in the third mode, the multiplexer is configured to receive the pass a data stream received on the second I/O to the PHY circuit.

14. A multi-chip module, comprising:
a substrate;
a first physical-layer (PHY) chip mounted on the substrate, the first PHY chip comprising a router and a physical-layer (PHY) circuit;
a second PHY chip mounted on the substrate; and
a first physical interface coupling the first PHY chip to the second PHY chip;
wherein the router of the first PHY chip is configured to receive a plurality of data packets from a media access control (MAC) device, the plurality of data packets comprising one or more first data packets having a first address associated with the first PHY chip and one or more second data packets having a second address associated with the second PHY chip, to route the one or more first of the plurality of data packets having the first address to the PHY circuit, and to route the one or more second of the plurality of data packets having the second address to the second PHY chip via the first physical interface.

15. The multi-chip module of claim 14, further comprising:
a third PHY chip mounted on the substrate;
a fourth PHY chip mounted on the substrate;
a second physical interface coupling the first PHY chip to the third PHY chip; and
a third physical interface coupling the first PHY chip to the fourth PHY chip;
wherein the plurality of data packets further comprises one or more third data packets having a third address associated with the third PHY chip and one or more fourth data packets having a fourth address associated with the fourth PHY chip, and the router of the first PHY chip is further configured to route the one or more third of the plurality of data packets having the third address to the third PHY chip via the second physical interface, and to route the one or more fourth of the plurality of data packets having the fourth address to the fourth PHY chip via the third physical interface.

16. The multi-chip module of claim 15, wherein the second PHY chip comprises a second router and a second PHY circuit, and wherein the second router is configured to pass the second data packets received from the first PHY chip via the first physical interface to the second PHY circuit.

17. The multi-chip module of claim 16, wherein the second router is configured to selectively operate in one of a first mode and a second mode, in the first mode, the second router is configured to route data packets based on addresses of the data packets, in the second mode, the second router is configured to pass the one or more second data packets from the first PHY chip to the second PHY circuit, and the second router is programmed to operate in the second mode.

18. The multi-chip module of claim 17, wherein the first PHY chip and the second PHY chip are substantially identical.

19. The multi-chip module of claim 17, wherein, in the second mode, the second router is configured to pass the one or more second data packets from the first PHY chip to the second PHY circuit without looking at addresses in the one or more second data packets.

20. The multi-chip module of claim 17, wherein the PHY circuit is configured to convert the one or more first data packets from the router into a first physical-layer data signal for transmission on a first Ethernet cable, and the second PHY circuit is configured to convert the one or more second data packets from the second router into a second physical-layer data signal for transmission on a second Ethernet cable.

* * * * *